United States Patent
Shike et al.

(10) Patent No.: US 7,761,563 B2
(45) Date of Patent: Jul. 20, 2010

(54) BACNET COMMUNICATION STATUS OBJECTS AND METHODS OF DETERMINING COMMUNICATION STATUS OF BACNET DEVICES

(75) Inventors: David Shike, Rockton, IL (US); Mike Wilson, Roscoe, IL (US); Rick Koch, Machesney Park, IL (US)

(73) Assignee: Schneider Electric Buildings AB, Malmö (SE)

( * ) Notice: Subject to any disclaimer, the term of this patent is extended or adjusted under 35 U.S.C. 154(b) by 281 days.

(21) Appl. No.: 12/132,723

(22) Filed: Jun. 4, 2008

(65) Prior Publication Data

US 2009/0287736 A1 Nov. 19, 2009

Related U.S. Application Data

(60) Provisional application No. 61/053,909, filed on May 16, 2008.

(51) Int. Cl.
*G06F 15/173* (2006.01)
(52) U.S. Cl. .................. 709/224; 709/203; 709/223; 709/227
(58) Field of Classification Search ................. 709/203, 709/223, 224, 227
See application file for complete search history.

(56) References Cited

U.S. PATENT DOCUMENTS

| 5,916,306 | A | 6/1999 | Ruiz | |
|---|---|---|---|---|
| 6,104,963 | A | 8/2000 | Cebasek et al. | |
| 6,850,978 | B2* | 2/2005 | Springmeyer et al. | 709/224 |
| 7,693,987 | B2* | 4/2010 | Hong et al. | 709/224 |
| 2004/0059814 | A1* | 3/2004 | Komiya et al. | 709/224 |
| 2005/0027811 | A1 | 2/2005 | Kraft | |
| 2007/0055758 | A1 | 3/2007 | McCoy et al. | |
| 2008/0195757 | A1* | 8/2008 | Kim et al. | 709/245 |
| 2009/0006611 | A1* | 1/2009 | Hong et al. | 709/224 |

OTHER PUBLICATIONS

Bill Swan, The Language of BACnet®-Objects, Properties and Service, article printed from website dated May 12, 2008, 10 pages, pp. 1-10, www.Alerton.com.

(Continued)

*Primary Examiner*—Phuoc Nguyen
(74) *Attorney, Agent, or Firm*—Reinhart Boerner Van Deuren P.C.

(57) ABSTRACT

BACnet objects and methods for efficiently monitoring the communication status of networks and devices in a building automation and control system are presented. A pair of bus communication status objects, including a server object and a client object, provide the communication status of an MS/TP network as an OCTET String transmitted only upon a change of value (COV) of the communication status of a device on the network. Individual devices may be monitored with a device communication status object, in conjunction with or apart from the bus communication status objects. For MS/TP devices, automatic configuration and monitoring in a controller is provided. For other devices, a user interface is provided through a graphical tool to allow configuration to specify the desired device and/or network for monitoring.

8 Claims, 8 Drawing Sheets

OTHER PUBLICATIONS

TAC, WorkPlace Tech Tool 5.6 Engineering Guide Supplement, MSTP Status, technical guide, 13 pages, pp. 94-106, Published on the TAC website (www.TAC.com) on Jun. 7, 2007.

TAC; TAC MicroNet BACnet™ Plant Controller; 2006, 4 pages, pp. 1-4.

Invensys Building Systems, Inc., MicroNet BACnet™ Plant Controller, 2005; 2-05 F27341, 4 pages, pp. 1-4.

American Standard Inc., Sample BACnet Messages via ARCNET and Point-to-Point (RS-232), Oct. 27, 1998, 40 pages, pp. 1-40.

* cited by examiner

BACNET COMMUNICATION STATUS OBJECTS AND METHODS OF DETERMINING COMMUNICATION STATUS OF BACNET DEVICES

FIELD OF THE INVENTION

This invention generally relates to building automation and control network (BACnet) data communications protocol, and more particularly to proprietary BACnet objects and methods for communications monitoring.

BACKGROUND OF THE INVENTION

Modern buildings and building complexes utilize complex building automation and control systems that typically include hundreds of distributed components, controllers, sensors, etc., often from various manufacturers. Such automation and control systems include heating, ventilating, and air-conditioning (HVAC) control, lighting control, access control, and fire detection and suppression systems, etc.

To ensure that these various systems work correctly, it is imperative that the components and controllers utilized in such systems are able to communicate with each other to share information and control signals. If all of the components were sourced from a single manufacturer, such integrated communication, likely from a proprietary communication protocol, would be assured. Unfortunately, this is not the reality in modern systems. As such, it is necessary that, at least externally of the devices themselves, a common communications protocol is used. For the building and automation control market, this common protocol is the Building Automation Control Network (BACnet) communication protocol. Since its development, BACnet has been adopted by the American National Standards Institute (ANSI) as ANSI/ASHRAE Standard 135-1995 and by the International Standards Organization (ISO) as ISO 16484-5 in 2003.

BACnet is a flexible, object oriented approach to communications protocol. It utilizes objects, properties and services to represent data and actions available in the building automation system. Within the BACnet protocol, there are also defined a number of data link/physical layers over which and how communications pass, including ARCNET (ANSI/ATA 878.1), Ethernet, BACnet/IP, Point-To-Point over RS-232, Master-Slave/Token-Passing (MS/TP) over RS-485, etc. With many of these, communications and control timing and communications bandwidth can become problematic as more and more devices are included in the building automation and control system.

As an example, many systems, e.g. in fire control systems governed by Underwriters Laboratory (UL) standard UL 864 Control Units and Accessories for Fire Alarm Systems, there is a requirement for notification of the failure of a component of the system within a certain amount of time. While BACnet provides for a method of determining the operational communication status of a device, requiring the periodic pinging of all system components at a rate to satisfy such a requirement uses up a substantial amount of bandwidth available, particularly when communications occurs over an MS/TP communications bus. This problem becomes acute as the size and complexity of the system grows.

As such, there is a need in the art for a system and method of monitoring the communication status of devices on a BACnet network that allows prompt detection of communications failures without using excessive communications bandwidth. Embodiments of the invention provide such systems and methods. These and other advantages of the invention, as well as additional inventive features, will be apparent from the description of embodiments of the invention provided herein.

BRIEF SUMMARY OF THE INVENTION

Embodiments of the present invention provide new and improved systems and methods for efficiently monitoring and/or sharing the communication status of BACnet devices and/or networks. More particularly, embodiments of the present invention provide new and improved BACnet objects and methods for efficiently monitoring and/or sharing the communication status of BACnet devices and/or networks.

In one embodiment, the invention provides a pair of proprietary BACnet objects that expose and determine the communications status of a network of BACnet MS/TP devices. Preferably, this information is utilized to form a BACnet OCTET STRING value. Changes in communication status of any device on the MS/TP network is identified as a change of value (COV) of the OCTET STRING. Controllers which desire or need to monitor the communications status of one or more MS/TP networks utilize a client object that subscribes to the server object for the MS/TP network(s) of interest. The controller for the MS/TP network utilizes a known process to monitor the communications on its network as the token is passed from device to device. In the event a change in communications status occurs on the MS/TP network, a BACnet server object monitoring the network notifies each subscribing client object with a COV Notification message.

In an embodiment of the present invention, a device communications status object is created for each BACnet device for which the communications status is monitored. In an embodiment that utilizes the client and server bus communications status objects, the device communication status objects are populated by the client bus communications status object. This eliminates the necessity of pinging the remote BACnet devices for their status, and therefore greatly reduces the network bandwidth used. In embodiments wherein client and server bus communication status objects are not used, remote BACnet device communication status monitoring is still enabled by the use of the device communication status objects, although pinging will be required. Automated creation of such device communication status objects for MS/TP devices, as well as interactive creation of device communication status objects for Ethernet, BACnet/IP and MS/TP devices is also provided with the support of interactive user interface screens.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the description that follows, the invention will be described in terms of various embodiments in exemplary operating environments of a building automation control system. However, these embodiments are presented by way of example and not by way of limitation, and the full scope the invention is hereby reserved. Specifically, the objects and methods described below may find applicability in various operating environments and with various communications protocols.

Figure 1:
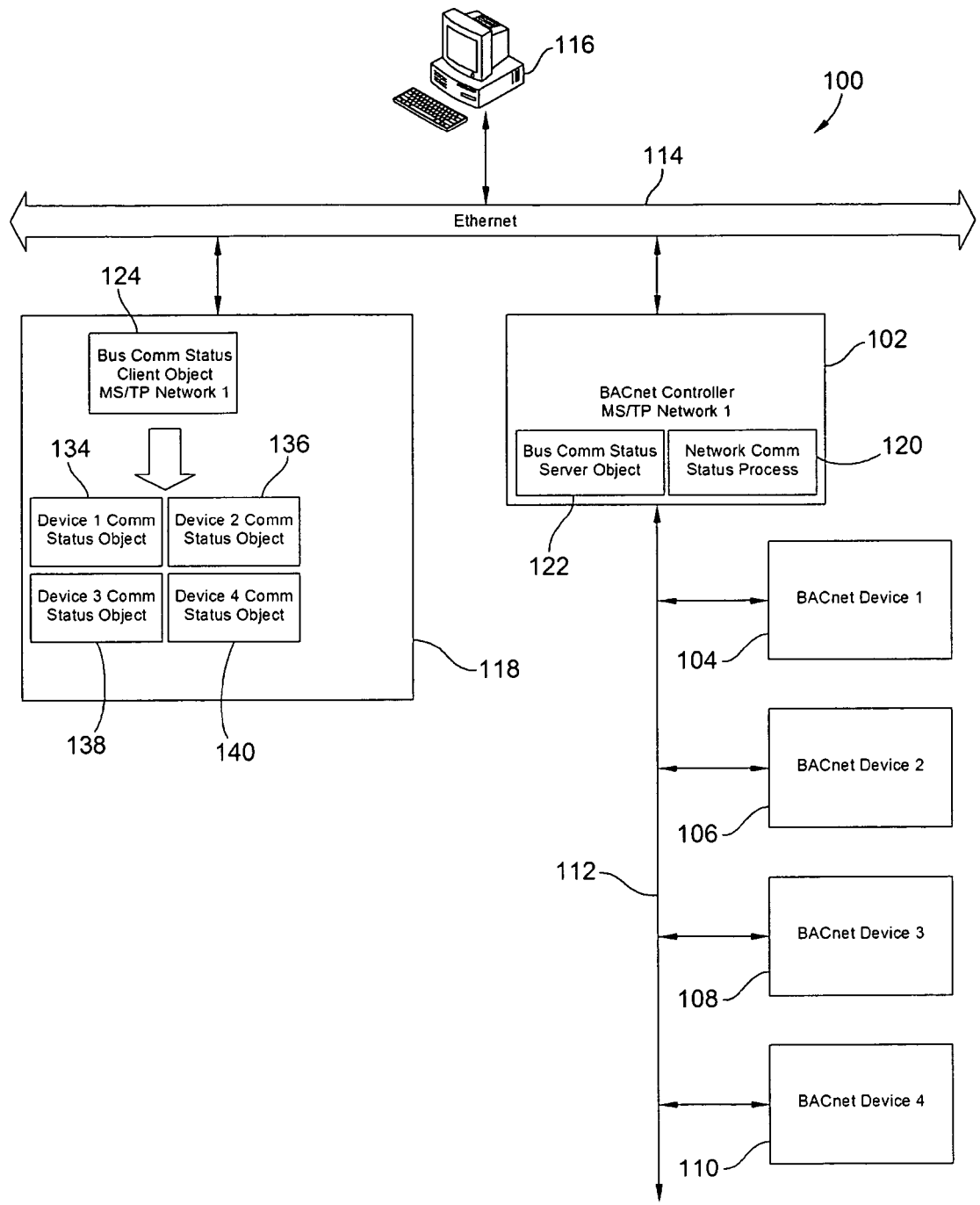
FIG. 1 is a simplified single line BACnet topology diagram illustrating features of an embodiment of the present invention.

Turning now specifically to FIG. 1, there is illustrated a simplified building automation control system 100 utilizing the BACnet communications protocol. In this exemplary system 100, a BACnet Controller 102, such as the TAC MicroNet BACnet MNB-1000 Plant Controller available from the assignee of the instant application, provides communications support and routing functionality between physical networks, as well as operational control and coordination of the various BACnet devices 104, 106, 108, 110 on its BACnet MS/TP communications bus 112. Such BACnet devices 104, 106, 108, 110 may include the TAC MicroNet BACnet MNB-300 Unitary Controller, the TAC MicroNet BACnet MNB-V1 Cooling Controller, the TAC MicroNet BACnet MNB-V2 Deluxe Controller, etc.

As illustrated, the BACnet Controller 102 also provides communications via an Ethernet TCP/IP and/or BACnet/IP bus 114. The system 100 may also include a PC workstation 116 with Enterprise Server and WorkPlace Tech Tool software, also available through the assignee of the instant application. This bus 114 may also serve as a conduit for communications with a remote controller 118, such as a TAC MicroNet BACnet MNB-1000 Plant Controller, etc.

Within the controller 102, a network communications status process 120 operates to monitor the token passing communications for the devices 104, 106, 108, 110 on its communications bus 112. In this way and as recognized by those skilled in the art, the controller 102 is able to automatically determine the communications status of the devices 104, 106, 108, 110 on its network 112 without requiring any pinging of those devices 104, 106, 108, 110.

With this knowledge in the controller 102, an embodiment of the present invention provides a pair of proprietary BACnet objects, the Bus Communications Status Server object 122 resident in controller 102 and the Bus Communications Status Client object 124 resident in the controller 118, that allow these two controllers 102, 118 to efficiently share the communications status of an entire BACnet MS/TP network 112 without requiring pinging of each of the devices 104, 106, 108, 110 on that network 112.

The MS/TP Bus Communications Status Server Object 122 is a proprietary BACnet object that exposes the communications status of a network 112 of BACnet MS/TP devices 104, 106, 108, 110 as a BACnet OCTET STRING value. The BACnet Object Identifier property of an MS/TP Bus Communications Status Server Object 122 corresponds to the BACnet network number of the MS/TP bus 112 represented by the object 122. The following table describes the properties of an embodiment of an MS/TP Bus Communications Status Server Object 122:

| Property | Datatype | Access | Description |
|---|---|---|---|
| Object_Identifier | BACnetObject Identifier | read only | This standard BACnet property consists of the Object_Type followed by the object instance number. The object instance number indicates the BACnet network number of the local MS/TP bus represented by the server object. Typical value: (512, 1354). |
| Object_Name | CharacterString | read only | A human readable character string that describes the object. Typical value, "MSTP Network 1354 Server". |
| Object_Type | BACnetObject Type | read only | A value of 512 identifies the object as an MS/TP Bus Communications Status Server Object. |

-continued

| Property | Datatype | Access | Description |
| --- | --- | --- | --- |
| Present_Value | OctetString, 16 bytes | read only | Indicates the communications status of the devices on the local MS/TP bus. For example, a value of &HFFFF0000000000000000000000000000 indicates that 16 devices at MS/TP addresses 0 through 15 are communicating normally. A value of &HF8FF0000000000000000000000000000 indicates that there is no device communicating at MS/TP address 4. |
| Status_Flags.IN_ALARM | BACnetStatus Flags | read only | This standard BACnet property will is always FALSE, since the Event_State property is not supported. |
| Status_Flags.FAULT | | read only | This standard BACnet property is always FALSE, since the Reliability property is not supported. |
| Status_Flags.OVERRIDDEN | | read only | This standard BACnet property is always FALSE, since Present_Value is not writable. |
| Status_Flags.Out_Of_Service | | read only | This standard BACnet property is always FALSE since the Out_Of_Service property is not supported. |

The MS/TP Bus Communications Status Client Object 124 is also a proprietary BACnet object. The following table describes the properties of an embodiment of an MS/TP Bus Communications Status Client Object 124:

| Property | Datatype | Access | Description |
| --- | --- | --- | --- |
| Object_Identifier | BACnetObject Identifier | read only | This standard BACnet property consists of the Object_Type followed by the object instance number. The object instance number indicates the BACnet network number of the remote MS/TP bus to be monitored by the client object. Typical value: (513, 2). |
| Object_Name | CharacterString | read only | A human readable character string that describes the object. Typical value, "MSTP Network 2 Client". |
| Object_Type | BACnetObject Type | read only | A value of 513 identifies the object as an MS/TP Bus Communications Status Client Object. |
| Present_Value | OctetString, 16 bytes | read only | Indicates the communications status of the devices on the remote MS/TP bus. For example, a value of &HFFFF0000000000000000000000000000 indicates that 16 devices at MS/TP addresses 0 through 15 are communicating normally. A value of &HF8FF0000000000000000000000000000 indicates that there is no device communicating at MS/TP address 4. |
| Status_Flags.IN_ALARM | BACnetStatus Flags | read only | This standard BACnet property will is always FALSE, since the Event_State property is not supported. |
| Status_Flags.FAULT | | read only | This standard BACnet property is always FALSE, since the Reliability property is not supported. |
| Status_Flags.OVERRIDDEN | | read only | This standard BACnet property is always FALSE, since Present_Value is not writable. |
| Status_Flags.Out_Of_Service | | read only | This standard BACnet property is always FALSE since the Out_Of_Service property is not supported. |

Figure 2:
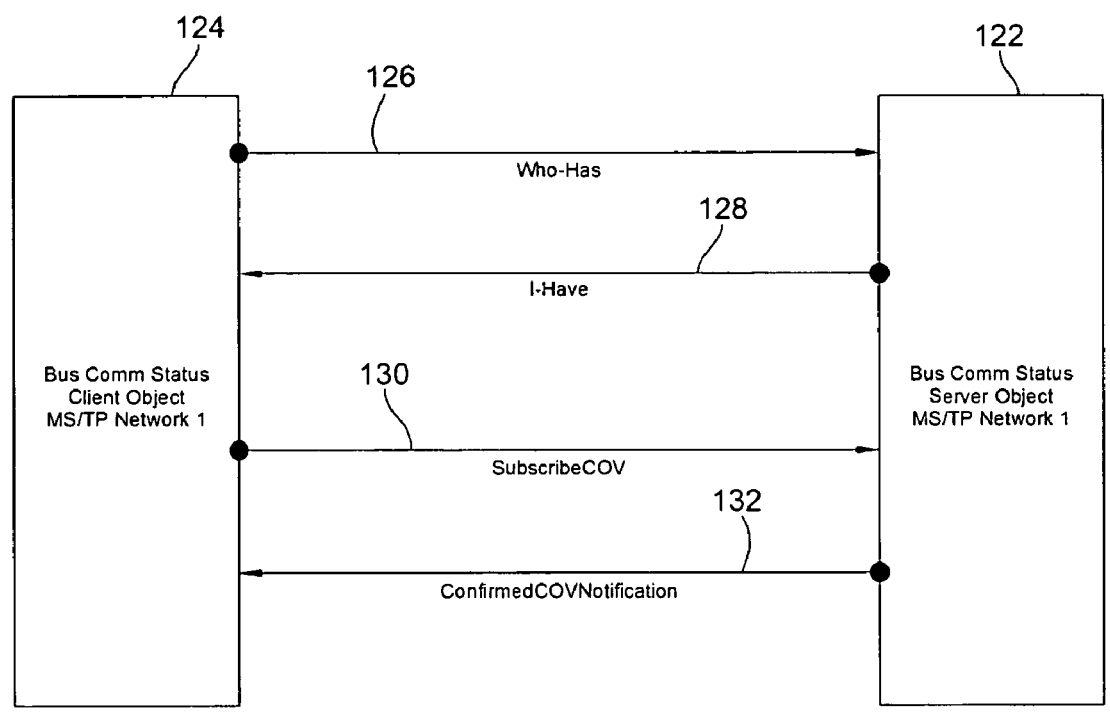
FIG. 2 is a simplified communications diagram illustrating communications message flow between two BACnet objects constructed in accordance with an embodiment of the present invention.

As illustrated in FIG. 2, when an MS/TP Bus Communications Status Client Object 124 is configured by its host controller 118 with the BACnet network number of a desired BACnet MS/TP network 112, the Client object 124 uses standard BACnet communications services (Who-Has and SubscribeCOV) to automatically locate and subscribe to the Server object 122 representing the communications status of the desired BACnet MS/TP network 112. Specifically, the client object 124 broadcasts 126 a Who-Has request specifying the network number of interest. The server object 122 for that network responds 128 with an I-Have message. The client object 124 then issues 130 a SubscribeCOV request to the server object 122. Once subscribed to the change of value (COV), the client object 124 will receive a notification 132, from the standard BACnet communications service ConfirmedCOVNotification, from the server object 122 whenever a change in value (COV) of the OCTET STRING occurs, which is indicative of the change in communication status of one or more of the devices on its network. The Client object 124 then provides the transmitted information to its host controller 118, and more specifically to the controller's device communication status objects 134, 136, 138, 140 illustrated in FIG. 1.

Figure 3:
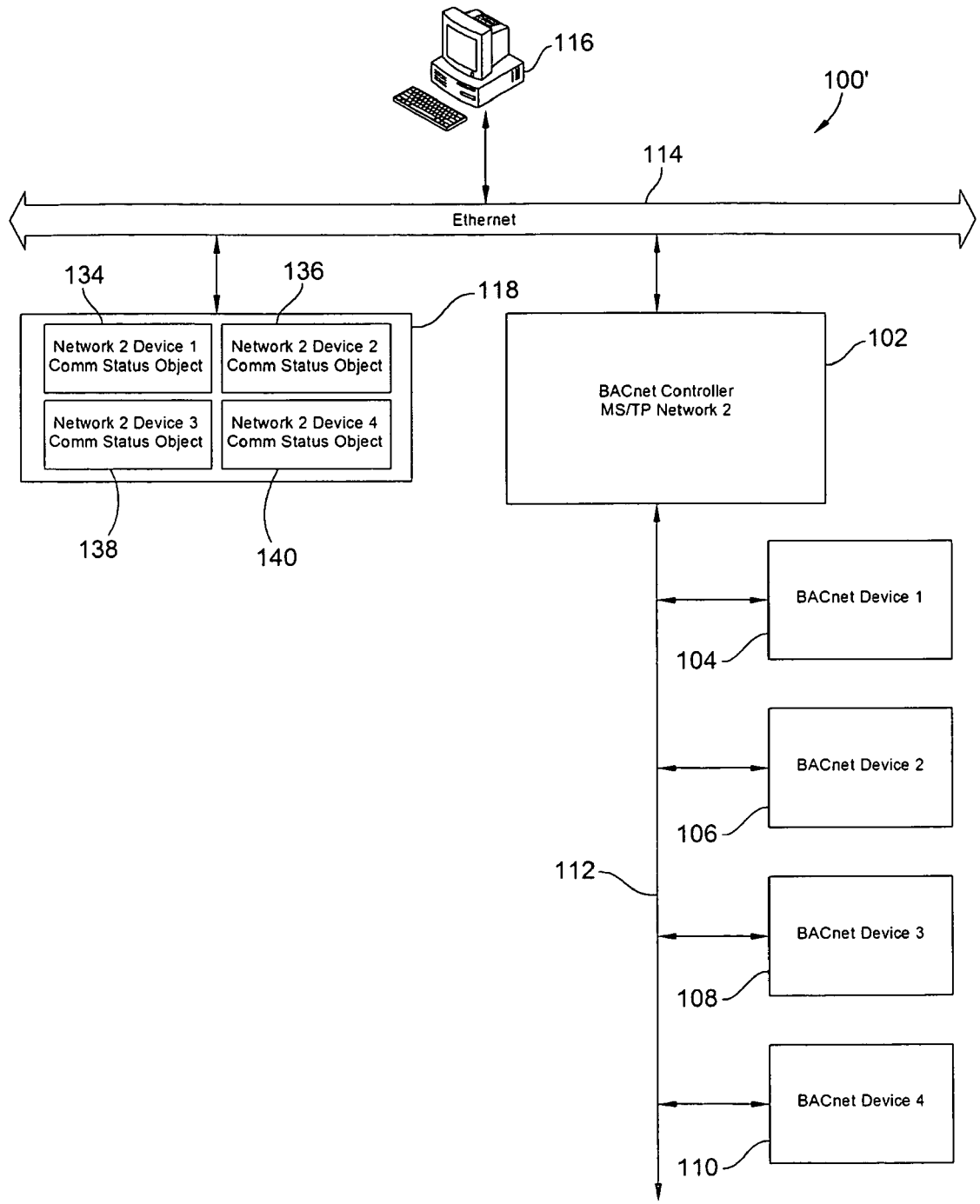
FIG. 3 is a simplified single line BACnet topology diagram illustrating features of an alternate embodiment of the present invention.

In addition or as an alternate to the configuration illustrated in FIG. 1 wherein the client and server objects 124, 122 are utilized, the physical device communication status objects 134, 136, 138, 140 may also be used in a system 100' without these other objects, such as illustrated in FIG. 3. In such a configuration, the device communication status objects 134, 136, 138, 140 provide the field engineer with a quick means of setting up communications status monitoring in a building control system, e.g. in an HVAC control system, a smoke control system, etc.

These physical device communication status objects 134, 136, 138, 140 can be used in two ways: to track the communication status of a specific device 104, 106, 108, 110 in a BACnet network 112; or to track the communication status of a group of devices by "background ORing" the outputs of a group of physical device communication status objects 134, 136, 138, 140 located in the host controller 118. This mode is accomplished by setting the Monitored Device Address property of the object to all 0xFFs as will be discussed below.

Monitoring a single BACnet device 104 on the BACnet network 112 is accomplished by explicitly specifying either the BACnet network number and MAC or the device object instance number of the device to be monitored. The BACnet network number is either an object input or an object configuration depending on the embodiment of the physical device communication status object. The MAC address or device object instance is specified as object configuration(s).

To configure an object to monitor a group of devices, the MAC address configuration is set to 0xFFs. A Physical Device Communication Status object with its MAC configuration set to 0xFFs will scan the host Device database for other devices with the same network number. If any devices with the same network number are offline, the output of the scanning Physical Device Communication Status object will be set to indicate offline status.

In one embodiment of the present invention, there are two types of physical device communication status objects. An MS/TP Device Communications Status Object will have a two-byte MAC address configuration property and be capable of monitoring MS/TP master devices only. A Universal Device Communications Status Object will have eight bytes for MAC address configuration, so it will be able to monitor BACnet devices on various BACnet network types (excluding MS/TP slave devices). These control objects will be exposed to the BACnet network as BACnet Background Binary Value (BV) objects. The BV object's Present Value will represent the Comm. Status output of the associated control object. The BACnet network number input will be exposed as a conditionally writable proprietary property. The MAC address configuration properties will be exposed as writable proprietary properties.

This approach relies on a re-usable MS/TP network template custom object in WPT. This custom object would be used for monitoring a group of devices on a given physical BACnet MS/TP network. The network number is limited to the range of 0-16383. Network 0 is used to monitor the local MS/TP network. The template custom object will contain 129 MS/TP Device Communication Status Objects. One of the MS/TP Device Communication Status Objects will have its MAC address configuration property set to 0xFF and its output connected to a custom object output. The other 128 Physical Device Communication Status Objects will have their MAC address configuration properties set sequentially from 0 to 127. The BACnet network number inputs of all 129 objects will be connected to a single input of the custom object via a buffer object. The custom object may also contain appropriate logic objects.

As an example of a procedure that can be used by field personnel to set up device communication monitoring in an exemplary smoke control application using the TAC MNB-1000 Plant Controller, field personnel would first add an instance of the above custom object to the communications monitoring MNB-1000 application for each MS/TP network to be monitored. Then they would set the network number input of each custom object to the BACnet network number of the target MS/TP network. The field engineer would then open each custom object and delete the MS/TP Device Communication Status Objects corresponding to devices that are not relevant to smoke control. They would also delete the MS/TP Device Communication Status Object corresponding to the host device. Custom objects for communications monitoring of devices on Ethernet or BACnet/IP networks would have to be set up manually using Universal Device Communication Status Objects to be discussed more fully below with regard to FIGS. 4-13. OR the outputs of all the communications monitoring custom objects and Universal Device Communication Status Objects would provide a system-wide communications status value. The field engineer would use a commissioning tool to set the BACnet network numbers of the plant controllers to correspond to the network numbers set in the preceding steps. The field engineer would then set the address DIP switches of the MS/TP devices to the values remaining from the third step described above. Finally, the field engineer would use the commissioning tool's existing mechanism to set the device instance numbers of all devices. Instance numbers are not relevant to the Physical Device Communication Status Object approach.

With the above description in hand, details of the MS/TP Device Communications Status Object, which provides an indication of whether or not the communication channel between the object's host device and some remote MS/TP device is operational, will now be discussed. As indicated above, this object can also be configured to indicate the communication status of a group of devices on a given MS/TP network. In one embodiment, the control object type number is 89. The String Table for one embodiment is as follows:

| String | BACnet Object Property | Description |
| --- | --- | --- |
| Object Name | none | WPT object name, ignored by the controller |

The Configuration Properties table for this embodiment is as follows:

| Control Object Property | BACnet Object Property | Class | Description |
| --- | --- | --- | --- |
| Create BACnet Object | none | Digital | This configuration property controls whether or not a background BACnet object is created. A background BACnet object allows other properties of the communications status object to be accessed via BACnet services. |

-continued

| Control Object Property | BACnet Object Property | Class | Description |
|---|---|---|---|
| | | | 0 - BACnet object is not created<br>1 - BACnet object is created<br>The default value is 1.<br>Note: The Status output of the communications status object indicates the communications status of the monitored device regardless of whether or not a background BACnet object is created. |
| Monitored Device MS/TP MAC Address | proprietary (832), OctetString, writable | 2 octets | This configuration property specifies the MS/TP MAC address of the device to be monitored by this object. This property is exposed via BACnet as a one-byte OctetString. The single octet maps to the first byte of the application database word. The valid values for the byte are 0xFF and the range 0x00 to 0x7F. An invalid value for this property causes the Status output of the control object to indicate Offline. When this property is set to 0xFF, the control object scans the host controller's application database for other Device Communication Status Objects with the same Monitored Device BACnet Network Number input value as this object. If any of the objects found indicate an offline status, the output of this object will be set to indicate offline status.<br>In one embodiment, this object allows monitoring of MS/TP slave devices by polling (device, 4194303). System_Status of the device to be monitored. If any acknowledgement is received, either a valid System_Status or an unknown object error, the monitored device would be considered to be online. |

The Control Object Inputs table for this embodiment is as follows:

| Control Object Input | BACnet Object Property | Class | Description |
|---|---|---|---|
| Monitored Device BACnet Network Number | proprietary (830), Unsigned, conditionally writable | Analog | This input specifies the BACnet Network Number of the device(s) to be monitored by this object. Valid values are whole numbers in the range of 0 to 16383. Zero is used to monitor devices on locally connected MS/TP port 0. An invalid value for this input causes the Status output of the control object to indicate Offline. This property is read-only if the input is connected to another object and writable if the input is connected to a constant. |

The Control Object Outputs table for this embodiment is as follows:

| Output | BACnet Object Property | Type Class | Description |
|---|---|---|---|
| Status | Present_Value, BACnetBinaryPV enumeration, read only | Digital | This output tracks the communication status of the device(s) this object is monitoring. Online status is indicated by Present_Value and Status output values of |

-continued

| Output | BACnet Object Property | Type Class | Description |
|---|---|---|---|
| | | | zero. Offline status is indicated by a Present_Value of 1 and a Status output value of 100. If a communications status object is configured to monitor the host device, the Status output indicates Offline. |

The following table describes the remaining supported BACnet object properties:

| Property | Datatype | Access | Description |
|---|---|---|---|
| Object_Identifier | BACnetObjectIdentifier | read only | The object type is BINARY_VALUE. The object instance is assigned sequentially by the host controller based on the order of the communications status objects within the application database. The instance numbers for communications status objects will be in the range xxx to yyy. |
| Object_Name | CharacterString | read only | The object name will be generated by the host controller. It must be unique among all BACnet objects within the controller. The maximum length is 20 characters. All characters must be printable characters. |
| Object_Type | BACnetObjectType | read only | BINARY_VALUE |
| Status_Flags.IN_ALARM | BACnetStatusFlags | read only | This property will is always FALSE, since Event_State is always NORMAL. |
| Status_Flags.FAULT | | read only | This property is always FALSE, since Reliability is always NO_FAULT_DETECTED. |
| Status_Flags.OVERRIDDEN | | read only | This property is always TRUE, since Present_Value is not writable. |
| Status_Flags.Out_Of_Service | | read only | This property is always FALSE. |
| Event_State | BACnetEventState | read only | This property is always NORMAL per ASHRAE 135-2004 clause 12.20.7(b). |
| Reliability | BACnetReliability | read only | This property is always NO_FAULT_DETECTED. |
| Out_Of_Service | BOOLEAN | read only | This property is always FALSE, since Present_Value can't be written. |
| Inactive Text | CharacterString | read only | This property is always "Online". |
| Active Text | CharacterString | read only | This property is always "Offline". |
| Profile_Name | CharacterString | read only | This property is always "11-89.00". |
| Monitored Device Address Type | proprietary (831), Enumerated | read only | This property is always 0 for MS/TP. |
| Change of State Timestamp | Proprietary (833), BACnetDateTime | read only | This property provides a timestamp of the last change of communication status this object detected. |

When these objects are created in an MNB-1000 application and then downloaded to the controller, the controller will automatically create the respective BACnet objects (Type=BV), create names for each, and assign their instance numbers (object ID). The total allowed range of instance numbers for the MSTP Status object is 589824 through 655359. The MNB-1000 maintains a table of Device Communications Status Instance Numbers (DCSIN) for this purpose. This table has 65536 possibilities and ranges from 0 through 65535. When these instance numbers are assigned to Device Communications objects, they are offset by a value of 589824, in order to place them in a specific number range unique to the MNB-1000. The object names will be automatically created based on the following convention: NNNNN=Network number assigned to the input of the object. BACnet object name=DEV_XXX_YYYYY Where: XXX=MAC Address YYYYY=Network Number.

The instance numbers will be assigned automatically, using the following formula: Device Communications Status Object ID=DCSIN+589824 Where: DCSIN=a value from 0 through 65535 that is maintained by the controller. Device Communications Status (DCS) instance numbers are assigned by the MNB-1000 on a first come, first served basis. When an application is downloaded into the controller, the controller checks the DCS database, which was created from the previously downloaded application, to determine whether a Device Communications Status object with a matching network number and MAC address exists from a previous download. If a matching DCSIN is found, the saved instance number is used for this Device Communications Status object. If not, the object is assigned the first open instance number available. If a database is configured with duplicate Device Communications Status Objects, the first duplicate object in the database will be created and given an instance number, and the remaining duplicate objects will be ignored. When Device Communication Status objects are deleted from the controller, their corresponding DCSINs are released and made available for reuse. The next time a database is downloaded, if it contains new (non-duplicate) Device Communication Status objects, the controller will use the free DCSINs, starting from the beginning of the table. This allows the controller to efficiently recycle the available DCSIN.

The Universal Device Communications Status Object differs from the MS/TP Device Communications Status Object in that the universal object can monitor Ethernet and BACnet/IP devices in addition to MS/TP devices. The universal object can also monitor devices on BACnet networks over the full range of allowable BACnet network numbers (1 to 65534). Like the MS/TP Device Communications Status Object, the universal object provides an indication of whether or not the communication channel between the object's host device and some remote device is operational. The object can also be configured to indicate the communication status of a group of devices on a given BACnet network. In an exemplary embodiment, the control object type number is 90. In this embodiment, the string table is as follows:

| String | BACnet Object Property | Description |
|---|---|---|
| Object Name | Object_Name, read only | Name of Object. |

The Configuration Properties table is as follows:

| Control Object Property | BACnet Object Property | Class | Description |
|---|---|---|---|
| Enable BACnet | none | Digital | This configuration property controls whether or not a background BACnet object is created. A background BACnet object allows other properties of the communications status object to be accessed via BACnet services.<br>0 - BACnet object is not created<br>1 - BACnet object is created<br>The default value is 1.<br>Note: The Status output of the communications status object indicates the communications status of the monitored device regardless of whether or not a background BACnet object is created. |
| Monitored Device BACnet Network Number | proprietary (830), Unsigned, writable | Unsigned Word | This configuration specifies the BACnet Network Number of the device(s) to be monitored by this object. Valid values are whole numbers in the range of 0 to 65534. Zero is used to monitor devices on the locally connected network of the type specified in the Monitored Device Address Type property. An invalid value for this input (65535) causes the Status output of the control object to indicate Offline. This property is not used by the controller when Monitored Device Address Type is 4. |
| Monitored Device Address Type | proprietary (831), Enumerated, writable | Analog | Enumeration values as follows:<br>1 - MS/TP<br>2 - Ethernet<br>3 - BACnet/IP<br>4 - Device ID<br>5 - Scan Mode<br>After this changing this property via BACnet to a value in the range 1 to 4, a new valid Monitored Device Address must also be written. The value of this property cannot be changed to or from 5 via BACnet.<br>When Monitored Device Address Type is 4 (Device ID mode), the control object ignores the Monitored Device BACnet Network Number and monitors the specified |

-continued

| Control Object Property | BACnet Object Property | Class | Description |
|---|---|---|---|
| | | | device only. Note: Device Communication Status Objects in Device ID mode cannot be scanned by another Device Communication Status Object in Scan Mode. When Monitored Device Address Type is 5 (Scan Mode), the control object ignores the Monitored Device Address and scans the host controller's application database for other Device Communication Status Objects with Device Address Type in the range 1 to 3 and with the same Monitored Device BACnet Network Number value as this object. If any of the objects found indicate an offline status, the output of this object will be set to indicate offline status. |
| Monitored Device Address | proprietary (832), OctetString, writable | 8 octets | This configuration property specifies the MAC address of the device to be monitored by this object. This property is exposed via BACnet as an OctetString, with length and valid values as a function of the Monitored Device Address Type property as follows.<br><br>Address Type / Length / Valid Values<br>1 - MS/TP / 1 / 0x00 to 0x7F<br>2 - Ethernet / 6 / 0x000000000000 to 0xFFFFFFFFFFFF<br>3 - BACnet/IP / 6 / 0x000000000000 to 0xFFFFFFFFFFFF<br>4 - Device ID / 4 / 0x00000000 to 0x003FFFFE<br>5 - Scan Mode / don't care / don't care<br><br>An invalid value for this property causes the Status output of the control object to indicate Offline. The BACnet OctetString is left justified within the 8 bytes allocated in the application database for this property. Two bytes are reserved following the maximum length OctetString to accommodate future MAC address types. |

In this embodiment there are no control object inputs. The control object outputs table is as follows:

| Output | BACnet Object Property | Type Class | Description |
|---|---|---|---|
| Status | Present_Value, BACnetBinaryPV enumeration, read only | Digital | This output tracks the communication status of the device(s) this object is monitoring. Online status is indicated by Present_Value and Status output values of zero. Offline status is indicated by a Present_Value of 1 and a Status output value of 100. If a communications status object is configured to monitor the host device, the Status output indicates Offline. |

The following table describes the remaining supported BACnet object properties:

| Property | Datatype | Access | Description |
|---|---|---|---|
| Object_Identifier | BACnetObjectIdentifier | read only | The object type is BINARY_VALUE. The object instance is assigned sequentially by the host controller based on the order of the communications status objects within the application database. The instance numbers for communications |

-continued

| Property | Datatype | Access | Description |
|---|---|---|---|
| | | | status objects will be in the range xxx to yyy. |
| Object_Name | CharacterString | read only | The object name will be generated by the host controller. It must be unique among all BACnet objects within the controller. The maximum length is 20 characters. All characters must be printable characters. |
| Object_Type | BACnetObjectType | read only | BINARY_VALUE |
| Status_Flags.IN_ALARM | BACnetStatusFlags | read only | This property will is always FALSE, since Event_State is always NORMAL. |
| Status_Flags.FAULT | | read only | This property is always FALSE, since Reliability is always NO_FAULT_DETECTED. |
| Status_Flags.OVERRIDDEN | | read only | This property is always TRUE, since Present_Value is not writable. |
| Status_Flags.Out_Of_Service | | read only | This property is always FALSE. |
| Event_State | BACnetEventState | read only | This property is always NORMAL per ASHRAE 135-2004 clause 12.20.7(b). |
| Reliability | BACnetReliability | read only | This property is always NO_FAULT_DETECTED. |
| Out_Of_Service | BOOLEAN | read only | This property is always FALSE, since Present_Value can't be written. |
| Inactive Text | CharacterString | read only | This property is always "Online". |
| Active Text | CharacterString | read only | This property is always "Offline". |
| Profile_Name | CharacterString | read only | This property is always "11-90.00". |
| Change of State Timestamp | Proprietary (833), BACnetDateTime | read only | This property provides a timestamp of the last change of communication status this object detected. This property will only be implemented if time allows. |

The Device Status object is configured differently than the other objects. Normally, when a user double-clicks an object, the Device Properties dialog box appears, allowing the user to configure the various properties. With the Device Status object, however, double-clicking its shape opens the Monitored Device for DevStat dialog box. This dialog serves as the interface by which the user configures this object. This interface has been designed to facilitate object configuration, and the configurable items in the dialog box may not necessarily be recognizable as the properties. For reference, the affected properties are: Monitored Device BACnet Network Number; Monitored Device Address Type; Monitored Device Address.

Monitoring a single BACnet device on the MS/TP, Ethernet, or BACnet/IP network is accomplished by explicitly specifying, as object configurations, one or more of the following items: BACnet Network Number, MS/TP Address (DIP Switch), Ethernet MAC Address, and/or Device Instance Number. To configure the Device Status object to monitor a group of MS/TP devices on the same network, configure it for Network and define the network number. Next, create an MSTP Status device for each MS/TP controller on that network. The Device Status object, when configured in this manner, will locate all MSTP Status objects in the same Plant controller, with the same network number, and logically "OR" them for its output status.

The way in which the BACnet object's name is assigned to the Device Status object is different from the MSTP Status object discussed previously. The system uses the name that is defined within WP Tech for the object, as the BACnet object name. This name can be uniquely identified by right-clicking the object and selecting Customize from the shortcut menu. It is recommended that the name utilize some sort of naming convention that will make it intuitive when learned by other BACnet devices. For instance, when the object is used to monitor the status of a complete MS/TP network, it could be named "MSTPNet_11864," where "11864" is the network number. In a case where an object is setup for monitoring a specific IP device by instance number, an example might be "DevIP_11000," where "11000" is the instance number.

Figure 4:
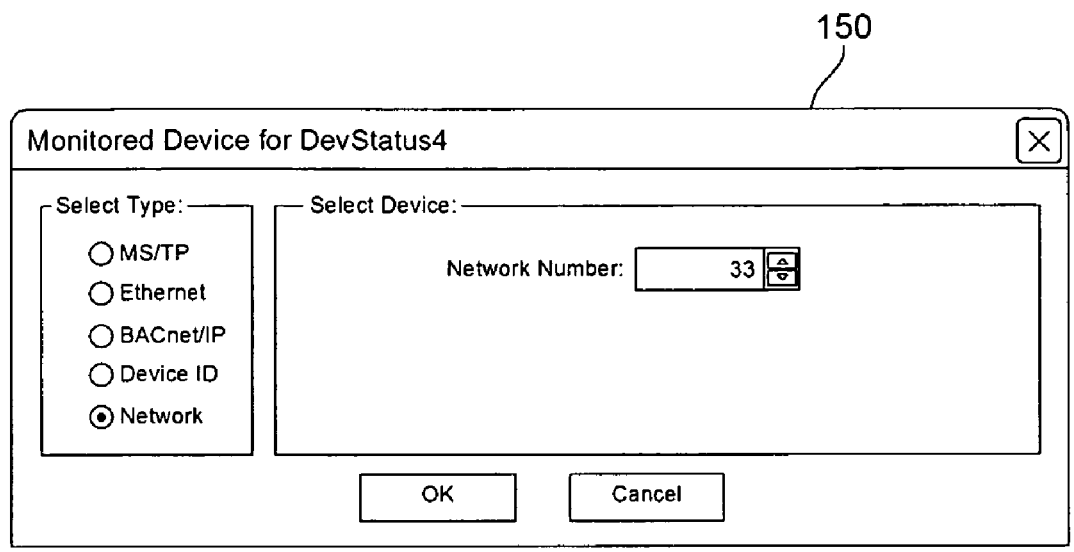
FIG. 4 illustrates one embodiment of a user interface provided in accordance with an embodiment of the present invention for selection of network communication monitoring.

As may now be apparent from the foregoing description, the universal device objects may be user configured, e.g. through the use of the WorkPlace Tech Tool available from the assignee of the instant application. When a Device Status object is placed on a drawing using this tool, it appears in its default mode. Right-clicking the object and choosing the Customize option from the shortcut menu will display the General and Properties tabs. The General tab provides the user with the opportunity to change the name associated with the object. This is the name that will also be used for the BACnet object that is created, if that feature is enabled. The Properties tab is used to enable or disable the display of selected properties, below the object. To access the dialog box used to configure the object, one must double-click the object. By default, the Monitored Device for DevStatus4 dialog box 150 will be displayed as illustrated in FIG. 4.

Figure 5:
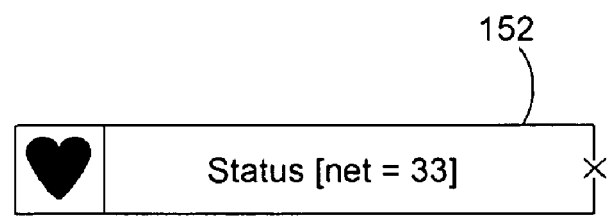
FIG. 5 illustrates an embodiment of a BACnet status indicator corresponding to a BACnet object configured via the user interface of FIG. 4.

When one clicks Network, the information shown on the right side of the dialog box 150 will be configured for defining the Network Number. This configuration is used to monitor the status of one or more Device Status or MSTP Status objects that have the same network number as the one that is set in this example. When compiled and downloaded to the controller, the Tool scans its database for all Device Status and MSTP Status objects that have the same network number, and logically "OR's" them together to determine the example object's output value. After the object has been configured in this manner, its shape's appearance 152 will change to reflect its network number as illustrated in FIG. 5.

Figure 6:
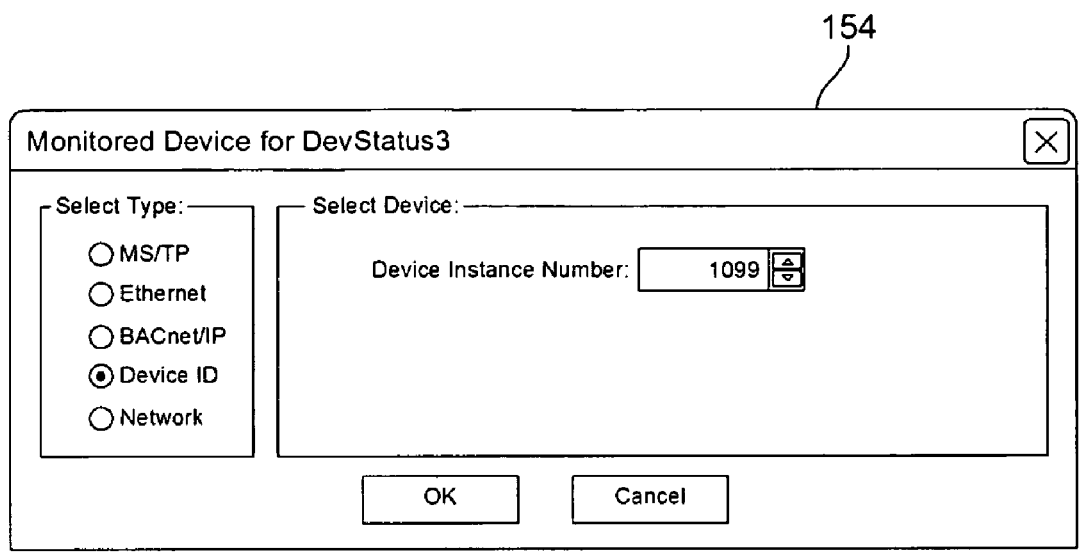
FIG. 6 illustrates one embodiment of a user interface provided in accordance with an embodiment of the present invention for selection of device communication monitoring.
Figure 7:
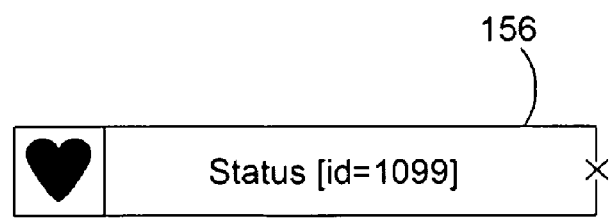
FIG. 7 illustrates an embodiment of a BACnet status indicator corresponding to a BACnet object configured via the user interface of FIG. 6.

When one clicks Device ID, the information shown on the right side of the dialog box 154 will be configured for defining the Device Instance Number as illustrated in FIG. 6. This configuration is used to monitor the status of one specific BACnet controller. After the object has been configured in this manner, its shape's appearance 156 will change to reflect its instance number as illustrated in FIG. 7.

Figure 8:
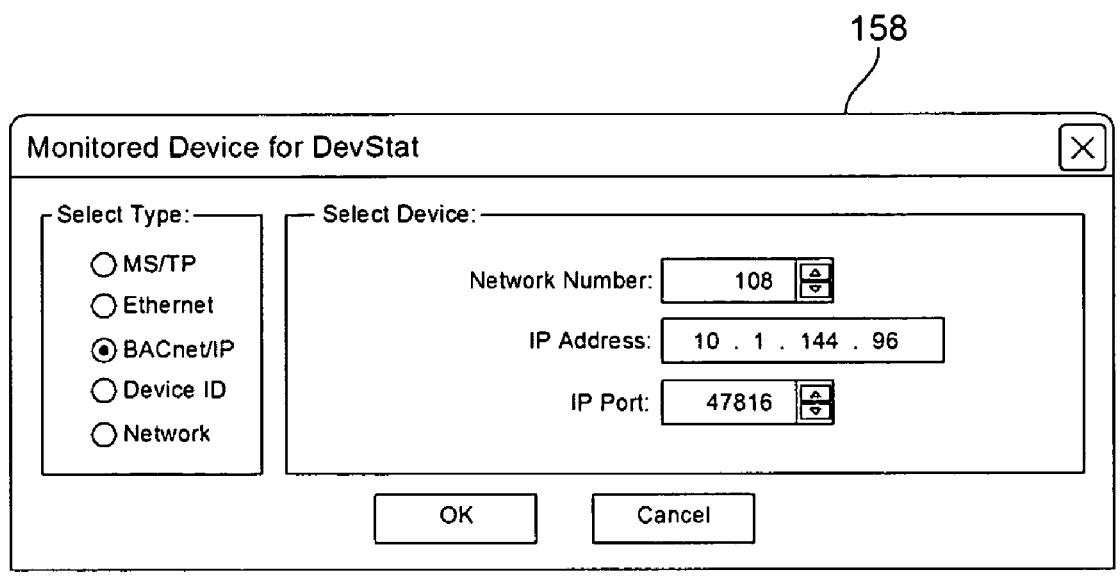
FIG. 8 illustrates one embodiment of a user interface provided in accordance with an embodiment of the present invention for selection of BACnet/IP network communication monitoring.
Figure 9:
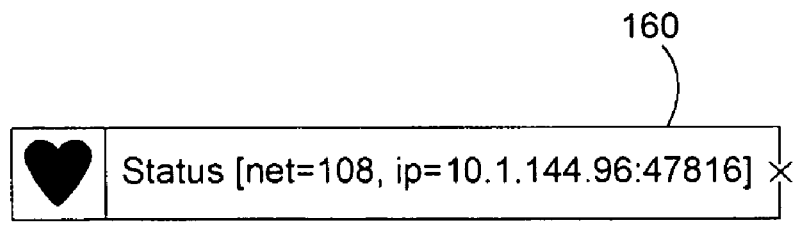
FIG. 9 illustrates an embodiment of a BACnet status indicator corresponding to a BACnet object configured via the user interface of FIG. 8.

When one clicks BACnet/IP, the information shown on the right side of the dialog box 158 will contain three fields: Network Number, IP Address, and IP Port as illustrated in FIG. 8. These need to be defined so that they correctly identify the BACnet/IP device that will be monitored. This configuration is used to monitor the status of one specific BACnet/IP controller. After the object has been configured in this manner, its shape's appearance 160 will change to reflect its configuration as illustrated in FIG. 9.

Figure 10:
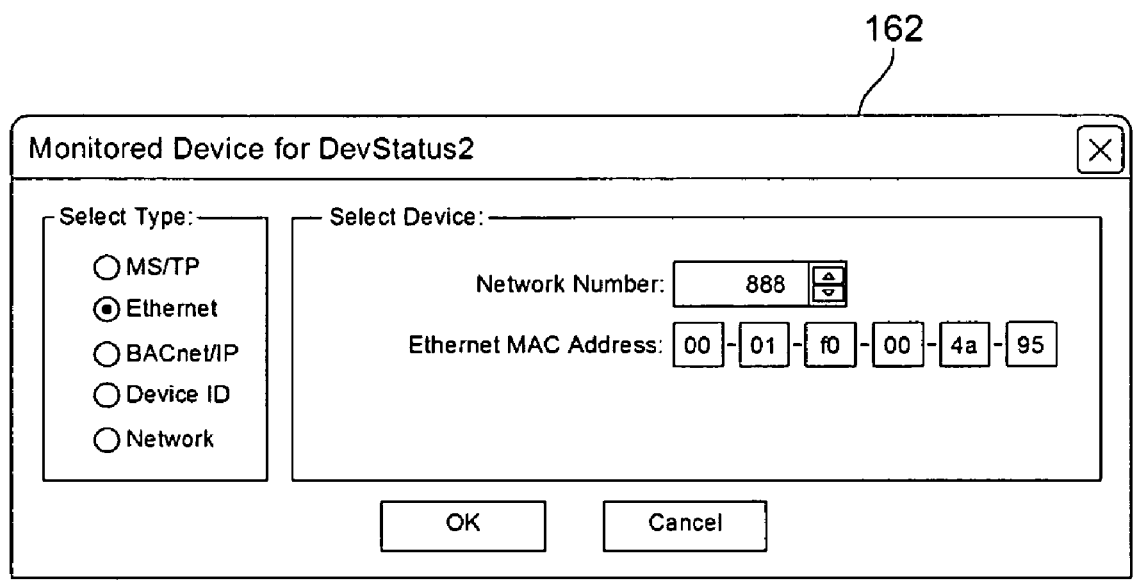
FIG. 10 illustrates one embodiment of a user interface provided in accordance with an embodiment of the present invention for selection of Ethernet communication monitoring.
Figure 11:
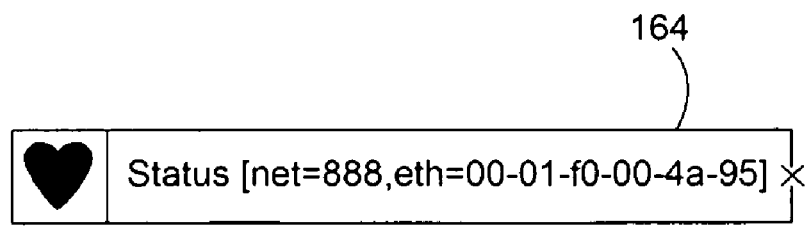
FIG. 11 illustrates an embodiment of a BACnet status indicator corresponding to a BACnet object configured via the user interface of FIG. 10.

When one clicks Ethernet, the information shown on the right side of the dialog box 162 will contain two fields: Network Number and Ethernet MAC Address as illustrated in FIG. 10. These need to be defined so that they properly identify the BACnet/Ethernet device that will be monitored. This configuration is used to monitor the status of one specific BACnet/Ethernet controller. After the object has been configured in this manner, its shape's appearance 164 will change to reflect its configuration as illustrated in FIG. 11.

Figure 12:
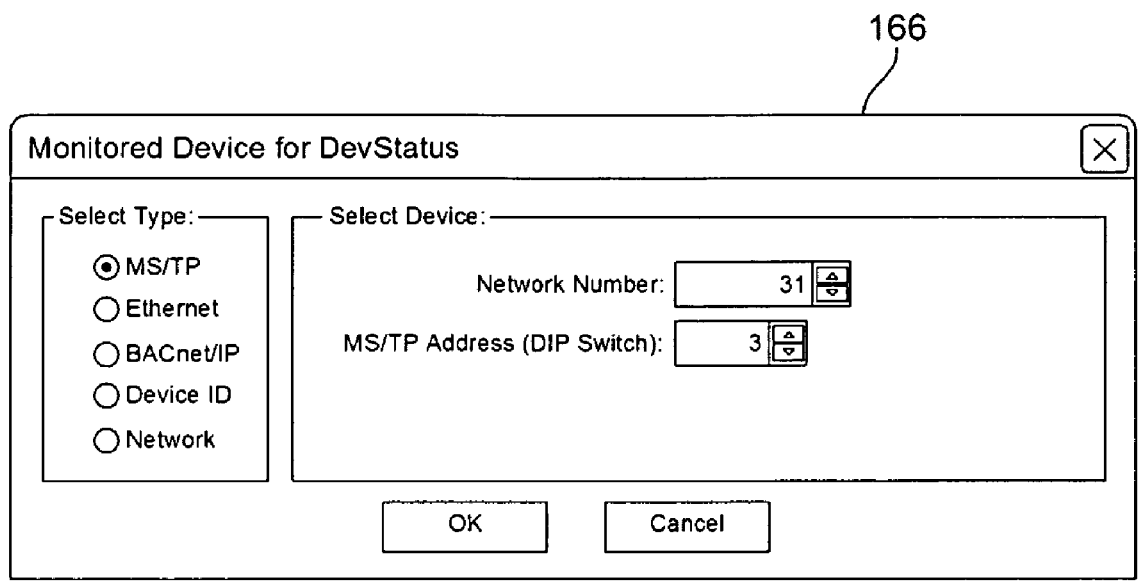
FIG. 12 illustrates one embodiment of a user interface provided in accordance with an embodiment of the present invention for selection of MS/TP communication monitoring.
Figure 13:
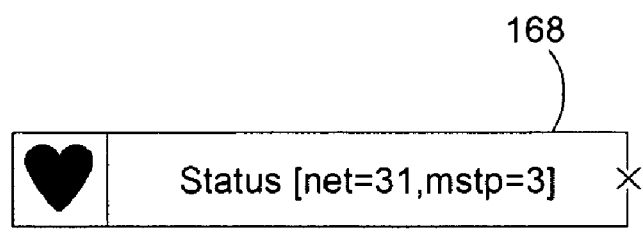
FIG. 13 illustrates an embodiment of a BACnet status indicator corresponding to a BACnet object configured via the user interface of FIG. 12.

When one clicks MS/TP, the information shown on the right side of the dialog box 166 will contain two fields: Network Number and MS/TP Address [DIP Switch] as illustrated in FIG. 12. These need to be defined so that they properly identify the BACnet/MSTP device that will be monitored. This configuration is used to monitor the status of one specific BACnet/MSTP controller. After the object has been configured in this manner, its shape's appearance 168 will change to reflect its configuration as illustrated in FIG. 13.

In all the cases discussed above ("Network Number," "Device Instance Number," "BACnet/IP," "Ethernet," and "MS/TP"), the Status output of the Device Status object will reflect the current communication status of the controller or network that is defined, where 0 (zero) indicates Online and 100 indicates Offline. A value of NA indicates a configuration problem or conflict.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of determining a communication status of at least one BACnet device, comprising the steps of:
monitoring communication of the at least one BACnet device on a local network bus;
generating by a bus communication status server object an octet string containing information reflecting the communication status of the at least one BACnet device;
transmitting the octet string upon a change of value (COV) of the octet string indicating a change in the communication status of at least one of the at least one BACnet device;
receiving by a bus communication status client object the octet string;
deciphering the octet string to determine the communication status of each of the at least one BACnet devices;
providing the communication status of each of the at least one BACnet devices to at least one corresponding device communication status object; transmitting by the bus communication status client object a Who-Has service request identifying the local network bus;
receiving by the bus communication status client object an I-Have service response identifying the bus communication status server object for the local network bus; and
transmitting by the bus communication status client object a SubscribeCOV service request to the bus communication status server object.

2. The method of claim 1, wherein the local network bus is a BACnet MS/TP communications bus, and wherein the step of monitoring communications comprises the step of monitoring token passing on the BACnet MS/TP communications bus.

3. The method of claim 1, further comprising the steps of creating the device communication status object for each of the at least one BACnet device.

4. A non-transistory computer readable medium having instructions for causing a computer to execute a method comprising the steps of:
- monitoring communication of the at least one BACnet device on a local network bus;
- generating by a bus communication status server object an octet string containing information reflecting the communication status of the at least one BACnet device;
- transmitting the octet string upon a change of value (COV) of the octet string indicating a change in the communication status of at least one of the at least one BACnet device;
- receiving by a bus communication status client object the octet string;
- deciphering the octet string to determine the communication status of each of the at least one BACnet devices; and
- providing the communication status of each of the at least one BACnet devices to at least one corresponding device communication status object; transmitting by the bus communication status client object a Who-Has service request identifying the local network bus;
- receiving by the bus communication status client object an I-Have service response identifying the bus communication status server object for the local network bus; and
- transmitting by the bus communication status client object a SubscribeCOV service request to the bus communication status server object.

5. A BACnet building automation and control system, comprising:
- a subnet controller operatively coupled via a BACnet MS/TP communication bus to at least one BACnet device to form a subnet, the subnet controller including a BACnet communication status process for monitoring the communication status of the at least one BACnet device, the subnet controller exposing a bus communication status server object operative to broadcast information regarding communication status of all of the BACnet devices on the subnet as monitored by the communication status process when a change of value of the communication status occurs;
- a remotely located BACnet controller in operative communication with the subnet controller, the BACnet controller exposing a bus communication status client object, and wherein the bus communication status client object subscribes to change of value broadcasts of the bus communication status server object to determine the communication status of all of the BACnet devices on the subnet; and wherein the bus communication status client object locates the bus communication status server object by broadcasting a Who-Has request that specifies a subnet number of interest, and wherein the bus communication status server object broadcasts an I-Have message in response to the Who-Has request when the subnet number matches the subnet controller's subnet number.

6. The system of claim 5, wherein the BACnet controller further exposes at least one device communication status object, the at least one device communication status object corresponding to the at least one BACnet device on the subnet, and wherein the device communication status object outputs the communication status of its corresponding BACnet device as determined by the bus communication status client object from the information broadcast from the bus communication server object.

7. The system of claim 5, wherein the bus communication status client object transmits a SubscribeCOV message to the bus communication status server object, and thereafter wherein the bus communication status server object transmits a ConfirmedCOVNotification message to the bus communication status client object when any change in communication status on the subnet.

8. The system of claim 5, wherein the information is in the form of an Octet String.

* * * * *